(12) United States Patent
Kuriyama (10) Patent No.: US 7,554,794 B2
(45) Date of Patent: Jun. 30, 2009

(54) SOLID ELECTROLYTIC CAPACITOR, ANODE USED FOR SOLID ELECTROLYTIC CAPACITOR, AND METHOD OF MANUFACTURING THE ANODE

(75) Inventor: Cojiro Kuriyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 185 days.

(21) Appl. No.: 10/592,192

(22) PCT Filed: Mar. 7, 2005

(86) PCT No.: PCT/JP2005/003892

§ 371 (c)(1),
(2), (4) Date: Sep. 8, 2006

(87) PCT Pub. No.: WO2005/086193

PCT Pub. Date: Sep. 15, 2005

(65) Prior Publication Data

US 2008/0198535 A1    Aug. 21, 2008

(30) Foreign Application Priority Data

Mar. 8, 2004   (JP)   .............................. 2004-063326

(51) Int. Cl.
*H01G 9/04* (2006.01)
*H01G 9/145* (2006.01)
(52) U.S. Cl. ..................... 361/528; 29/25.03
(58) Field of Classification Search ......... 361/528–529; 29/25.03
See application file for complete search history.

(56) References Cited

U.S. PATENT DOCUMENTS

| 4,599,788 | A | 7/1986 | Love et al. |
| 6,351,371 | B1 * | 2/2002 | Yoshida et al. .............. 361/528 |
| 6,775,127 | B2 | 8/2004 | Yoshida |
| 6,849,292 | B1 * | 2/2005 | Huntington .................. 427/79 |
| 7,349,197 | B2 * | 3/2008 | Ando .......................... 361/523 |

FOREIGN PATENT DOCUMENTS

| JP | 59-219923 | 12/1984 |
| JP | 61-51911 | 3/1986 |
| JP | 2001-185460 | 7/2001 |
| JP | 2003-506887 | 2/2003 |
| JP | 2003-338433 | 11/2003 |
| WO | WO 01/11638 | 2/2001 |

OTHER PUBLICATIONS

International Search Report for corresponding PCT application PCT/JP2005/003892, mailed Jun. 7, 2005.

* cited by examiner

*Primary Examiner*—Eric Thomas
(74) *Attorney, Agent, or Firm*—Hamre, Schumann, Mueller & Larson, P.C.

(57) ABSTRACT

An electrode (A1) for a solid electrolytic capacitor includes a metal plate (1) made of valve metal, and a porous sintered body (2a, 2b) provided on the metal plate (1) and made of valve metal. The porous sintered body includes a first sintered member (2a), and a second sintered member (2b) intervening between the first sintered member (2a) and the metal plate (1). The first sintered member (2a) is greater in density than the second sintered member (2b).

5 Claims, 9 Drawing Sheets

SOLID ELECTROLYTIC CAPACITOR, ANODE USED FOR SOLID ELECTROLYTIC CAPACITOR, AND METHOD OF MANUFACTURING THE ANODE

TECHNICAL FIELD

The present invention relates to a solid electrolytic capacitor using a porous sintered body made of valve metal, and particularly relates to an anode used for such a solid electrolytic capacitor. The present invention also relates to a method for manufacturing such an anode.

BACKGROUND ART

Figure 15A:
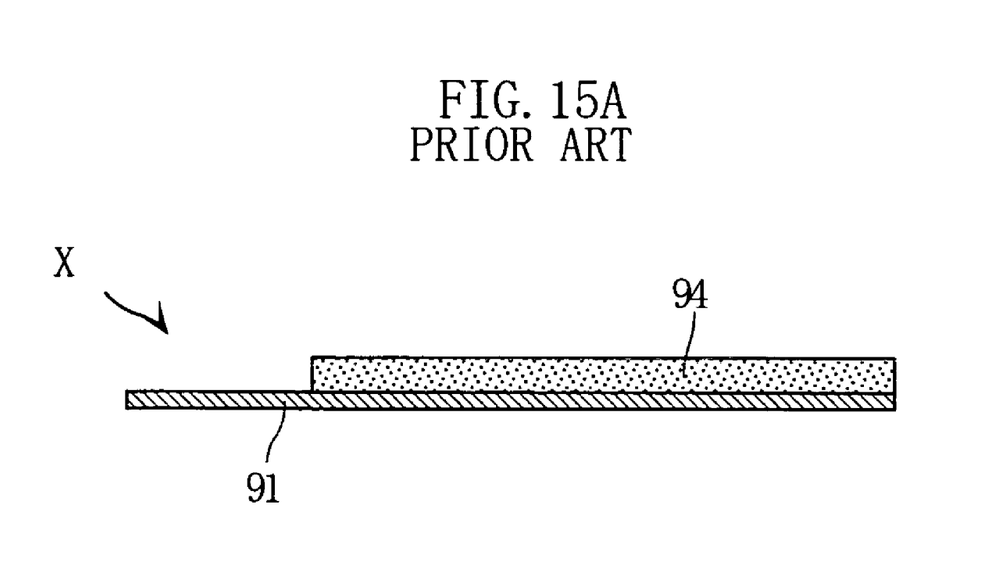
Figure 15B:
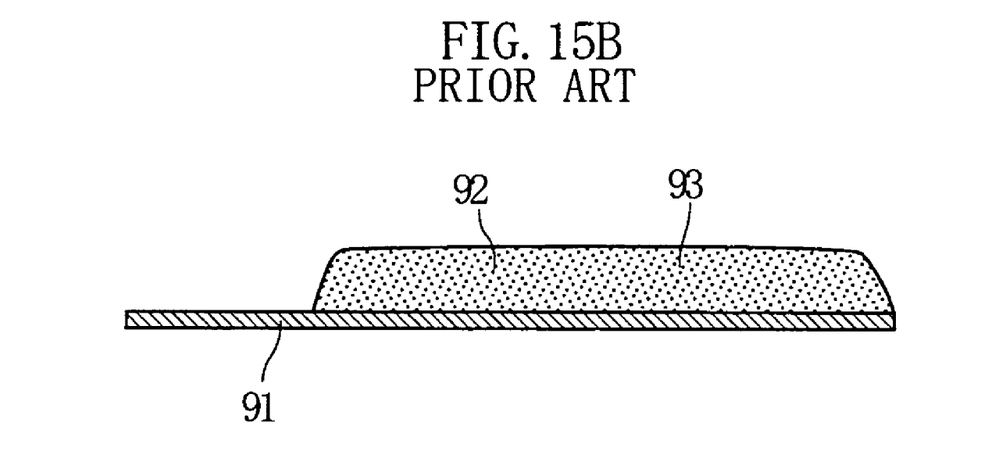
FIG. 15B is a sectional view for describing a conventional method for manufacturing a solid electrolytic capacitor anode.

An example of anode used for a solid electrolytic capacitor is disclosed in the Patent Document 1 described below. As shown in FIG. 15A of the present application, the conventional anode includes a metal plate 91 and a porous sintered body 94 formed on the metal plate. The metal plate 91 and the sintered body 94 are made of metal having valve action (hereinafter simply referred to as "valve metal"). As shown in FIG. 15B, the illustrated anode X is prepared by applying a material 93 containing valve metal powder 92 onto the metal plate 91 and then sintering the material 93. With this method, the sintered body 94 having a desired size in plan view and a relatively small thickness can be easily formed. This means that the capacitance, the ESR (equivalent series resistance) and the ESL (equivalent series inductance) of the solid electrolytic capacitor in which the anode X is used can be easily adjusted.

Patent Document 1: JP-A-S59-219923

Recently, various electronic devices tend to be reduced in size. Accordingly, a solid electrolytic capacitor to be incorporated in such an electronic device needs to be small. On the other hand, to cope with an increase in power supply, the capacitance of a capacitor needs to be increased. In a solid electrolytic capacitor using the above-described anode A, by increasing the capacitance per unit volume of the sintered body 94, the capacitance of the capacitor can be increased without increasing the size of the capacitor. In the process of manufacturing the anode X, a binder solution, for example, contained in the material 93 volatilizes in sintering the material, and the powder 92 left on the anode metal plate 91 is sintered to form the porous sintered body 94. In this process, any particular processing for increasing the density of the porous sintered body 94 is not performed. Therefore, in the anode X, the capacitance per unit volume of the porous sintered body 94 is not sufficiently high, so that the need for small size and large capacitance of the solid electrolytic capacitor cannot be properly satisfied.

DISCLOSURE OF THE INVENTION

The present invention is conceived under the circumstances described above. It is, therefore, an object of the present invention to provide a solid electrolytic capacitor anode capable of realizing both of a reduction in size and an increase in capacitance. It is another object of the present invention to provide a solid electrolytic capacitor provided with such an anode. It is still another object of the present invention to provide a method for manufacturing such an anode.

To solve the above-described problems, the present invention takes the following technical measures.

According to a first aspect of the present invention, there is provided an anode for a solid electrolytic capacitor. The anode comprises a metal plate made of valve metal, and a porous sintered body provided on the metal plate and made of valve metal. The porous sintered body includes a first sintered member, and a second sintered member intervening between the first sintered member and the metal plate. The first sintered member is greater in density than the second sintered member.

With this structure, the first sintered member is spaced from the metal plate and is not directly bonded to the metal plate. Therefore, in selecting the material for forming the first sintered member, it is not necessary to consider the bond properties of the material to the metal plate. Therefore, there is a wide choice of materials, so that a material and a manufacturing method suitable for forming a sintered member having a high density can be selected. By forming a high-density sintered member, the capacitance of the anode is increased without increasing the size, so that a solid electrolytic capacitor having a reduced size and an increased capacitance can be provided. Since a large capacitance by the first sintered member is obtained, the density of the second sintered member does not need to be so high. Therefore, as the material of the second sintered member, the material which is suitable for bonding to both of the first sintered member and the metal plate can be selected. In this way, the two sintered members and the metal plate can be reliably bonded together, and the electric resistance and inductance at the bonded portions (and hence, at the anode) can be reduced.

Preferably, the first sintered member is thin. With this structure, the current path within the first sintered member is short, which is advantageous for reducing the resistance and the inductance.

Preferably, the metal plate provides a metal case for protecting the first sintered member and the second sintered member at least partially. With this structure, in the process of manufacturing the solid electrolytic capacitor, the first sintered member and/or the second sintered member can be prevented from breaking by hitting against an obstacle, for example. The metal cover can have a higher rigidity as compared with resin, for example. Therefore, in using a solid electrolytic capacitor incorporating the anode, the solid electrolytic capacitor is prevented from being deformed due to the heat generation at the first and the second sintered members.

Preferably, the first sintered member includes a plurality of sintered elements, and the sintered elements are arranged side by side in a direction crossing a thickness direction of the sintered elements. With this structure, the volume of the first sintered member (i.e., the total volume of the sintered elements) included in the anode can be increased without increasing the size of each sintered element. Generally, as the size of a first sintered member increases, it becomes more difficult to make the first sintered member to be thin and have high density. However, the above-described structure can solve such a problem. Further, the total volume of the sintered elements can be increased without increasing the height of the anode. Therefore, the anode is suitable for the thickness reduction of the solid electrolytic capacitor.

According to a second aspect of the present invention, there is provided a solid electrolytic capacitor including an anode having the above-described structure. As will be understood from the above description of the anode, with this structure, both of a reduction in size and an increase in capacitance of a solid electrolytic capacitor can be realized, and the ESR and the ESL can be advantageously reduced.

Preferably, at least part of the metal plate functions as an external anode terminal for external connection. With this structure, the resistance and inductance between the first sintered member and the external anode terminal can be reduced.

Further, the number of parts necessary for manufacturing a solid electrolytic capacitor can be reduced. Therefore, the manufacturing efficiency of a solid electrolytic capacitor can be enhanced, and the manufacturing cost can be reduced.

According to a third aspect of the present invention, there is provided a method for manufacturing an anode for a solid electrolytic capacitor. The method comprises the steps of bonding a porous body formed by compacting valve metal powder and a metal plate made of valve metal to each other by using a bonding material containing valve metal powder, and forming a porous sintered body by heating the porous body with the metal plate.

With this method, the solid electrolytic capacitor anode according to the first aspect of the present invention can be manufactured properly and efficiently. Particularly, to provide a high-density porous sintered body, it is preferable that the porous body therefor has a high-density and contains minute pores even after compressed with a large pressure, which may be realized by forming the porous body by using powder of an appropriate average particle size, for example. The porous body is not directly bonded to the metal plate. Therefore, the porous body does not need to have properties suitable for bonding to the metal plate. Therefore, the porous body can be formed to have a high density, so that the porous sintered body can have a high density. Further, the porous sintered body made from the bonding material does not need to have a very high density. Therefore, as the bonding material, it is possible to select a material which has a great affinity with both of the porous body and the metal plate and which can properly bond these parts together when heated.

According to a fourth aspect of the present invention, there is provided a method for manufacturing an anode for a solid electrolytic capacitor. The method comprises the steps of preparing a porous sintered body made of valve metal and a metal plate made of valve metal, and bonding the porous sintered body and the metal plate to each other by using a bonding material containing valve metal powder. Also with this method, the solid electrolytic capacitor anode according to the first aspect of the present invention can be manufactured properly and efficiently. Particularly, the porous sintered body is formed by e.g. sintering the porous body solely, and the porous body is bonded to the metal plate after it is sintered. By sintering the porous body solely in this way, such a problem that other parts are heated excessively does not occur even when heating is performed to a temperature suitable for obtaining a high-density porous sintered body. Moreover, in sintering the bonding material after the porous sintered body and the metal plate are bonded together, heating does not need to be performed to such a high temperature necessary for forming a high-density porous sintered body, which is advantageous for reducing the manufacturing cost.

Other features and advantages of the present invention will become more apparent from the detailed description given below with reference to the accompanying drawings.

BRIEF DESCRIPTION OF THE DRAWINGS

FIG. 15A is a sectional view showing a conventional solid electrolytic capacitor anode, whereas

BEST MODE FOR CARRYING OUT THE INVENTION

Preferred embodiments of the present invention will be described below in detail with reference to the accompanying drawings.

Figure 1:
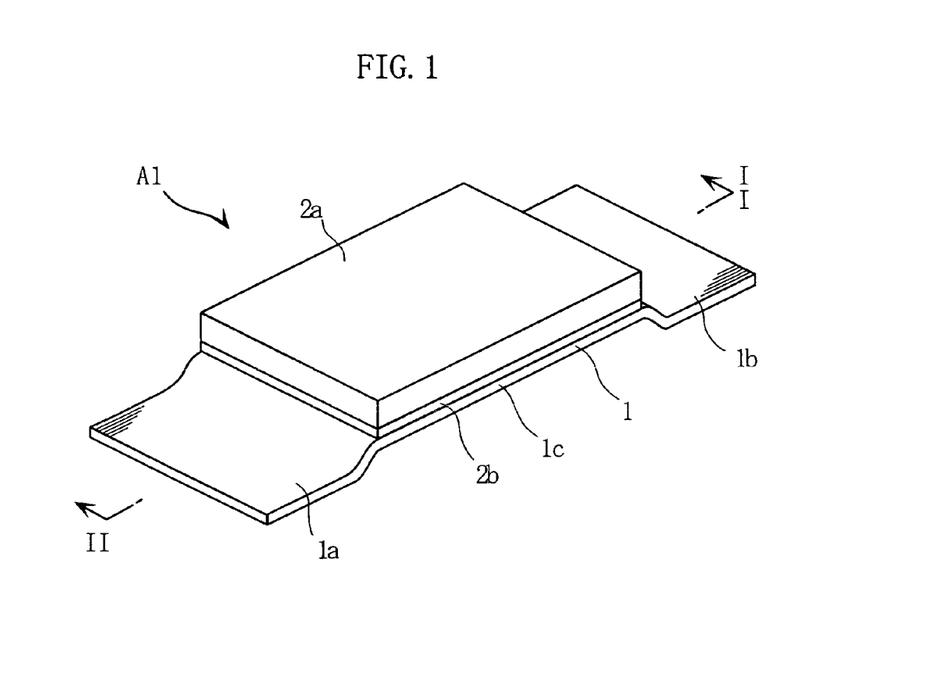
FIG. 1 is a perspective view showing a solid electrolytic capacitor anode according to a first embodiment of the present invention.
Figure 2:
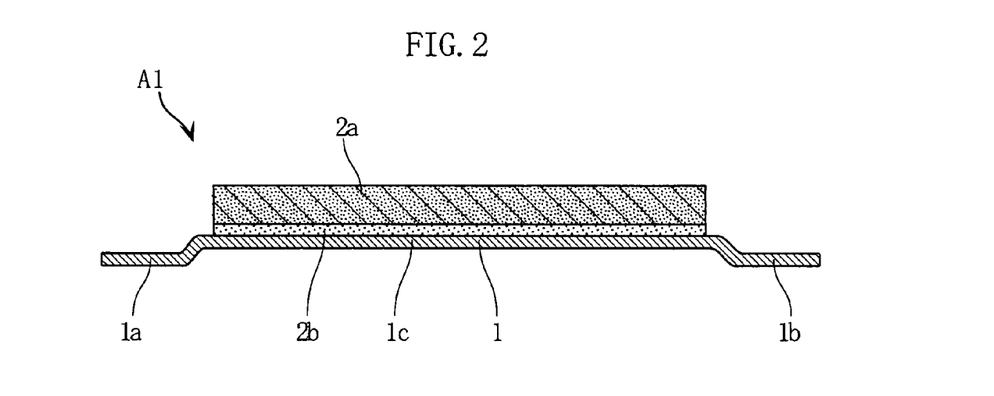
FIG. 2 is a sectional view taken along lines II-II in FIG. 1.

FIGS. 1 and 2 show an example of a solid electrolytic capacitor anode according to a first embodiment of the present invention. The illustrated anode A1 includes an anode metal plate 1 and a first and a second porous sintered members 2a and 2b.

The first sintered member 2a is formed by compacting niobium powder, which is a metal material having valve action (valve metal), into a rectangular plate and then sintering the plate. The first sintered member 2a is provided on the anode metal plate 1 via the second sintered member 2b. As the material of the first sintered member 2a, any valve metal can be used, and tantalum may be used instead of niobium, for example. However, since niobium is superior to tantalum in flame retardancy, niobium is preferable as the material of the first sintered member 2a which produces heat in use.

The second sintered member 2b is provided between the first sintered member 2a and the anode metal plate 1. The second sintered member 2b is formed by sintering a bonding material containing niobium powder by the manufacturing method which will be described later.

The anode metal plate 1 is made of niobium similarly to the first and the second sintered members 2a and 2b and includes two end portions 1a, 1b and a center portion 1c. The anode metal plate 1 is bent to form a stepped portion between the center portion 1c and each of the end portions 1a, 1b. The center portion 1c has an upper surface on which the first sintered member 2a is stacked via the second sintered member 2b. In a solid electrolytic capacitor in which the anode A1 is used, the opposite end portions 1a and 1b serve as external anode terminals for external connection.

An example of method for manufacturing the anode A1 will be described below with reference to FIGS. 3-6.

Figure 3:
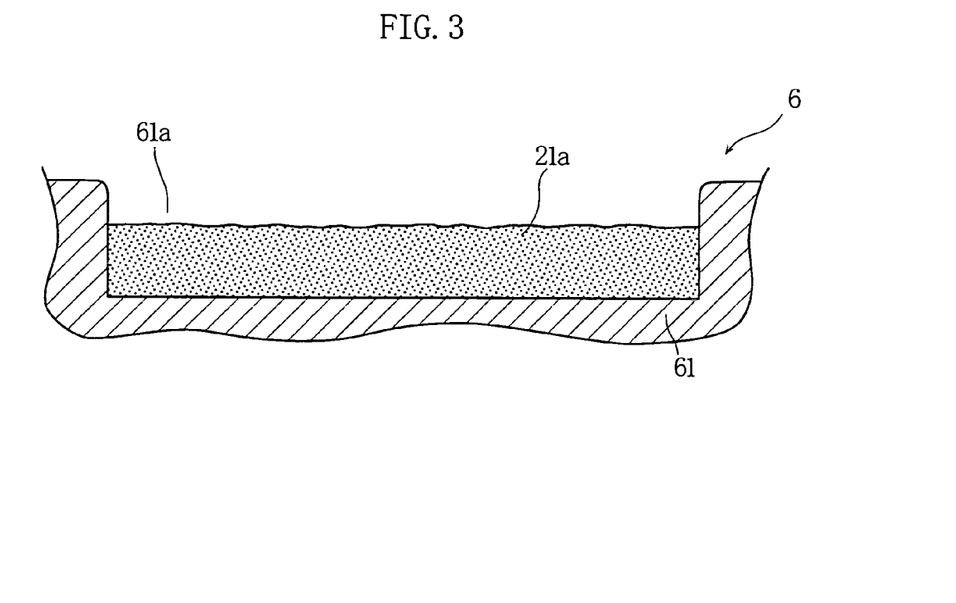
FIG. 3 is a sectional view showing a process step of a method for manufacturing the anode shown in FIG. 1.
Figure 4:
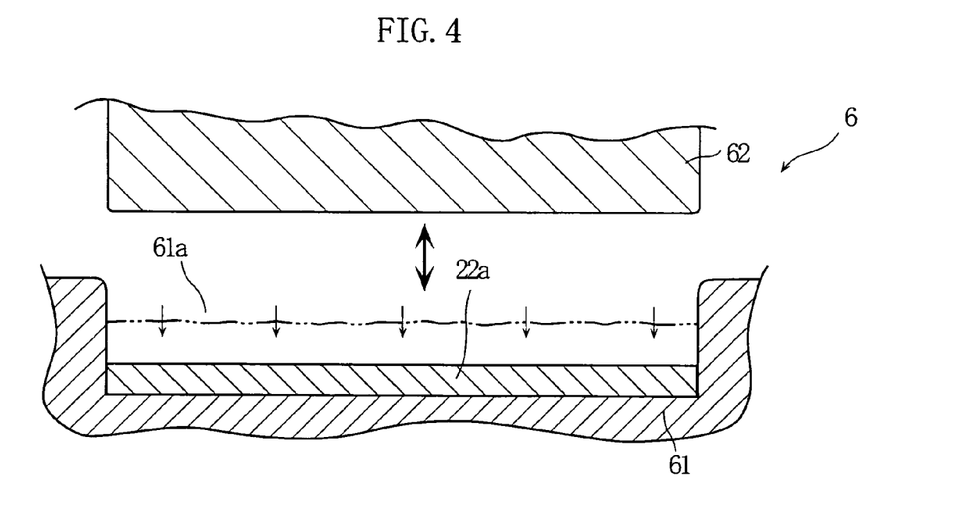
FIG. 4 is a sectional view showing a process step subsequent to the process step shown in FIG. 3.

First, a porous body as an original form of the first sintered member 2a is prepared. As shown in FIG. 3, to prepare the porous body, niobium powder 21a is loaded into a cavity 61a in a die 61 of a mold 6. Subsequently, as shown in FIG. 4, a punch 62 which can be fitted into the cavity 61a is moved downward from above the die 61. By moving down the punch 62, the powder 21a in the cavity 61a is compressed, whereby a porous body 22a is obtained. For instance, the compressive force by the punch 62 in this step is of such a degree that the powder 21a is compressed into a porous body 22a whose volume is about one-half to one-third of the volume of the powder. The first sintered member 2a later formed from the porous body 22a by subsequent process steps is subjected to a process for impregnating a predetermined solution into the sintered body to form a dielectric layer (not shown) and a solid electrolytic layer (not shown) in an inner surface and part of an outer surface of the sintered body. Therefore, to properly perform such a process, it is preferable that the selected powder 21a should be a material which can be compacted into a high-density porous body 22a by the compression by the punch 62 and which is capable of sufficiently containing minute pores.

Figure 5:
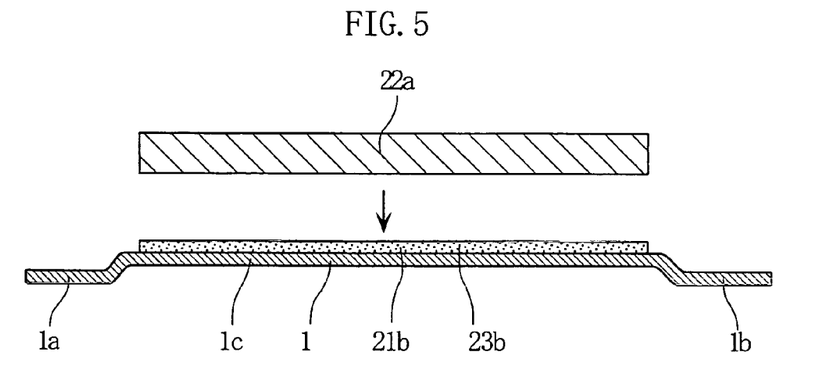
FIG. 5 is a sectional view showing a process step subsequent to the process step shown in FIG. 4.
Figure 6:
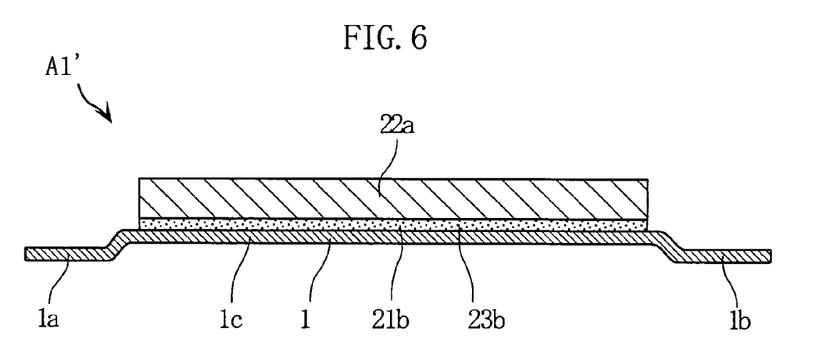
FIG. 6 is a sectional view showing a process step subsequent to the process step shown in FIG. 5.

As shown in FIG. 5, an anode metal plate 1 bent to include a stepped portion between the center portion 1c and each of opposite end portions 1a and 1b is prepared. A bonding material 23b is applied to an upper surface of the center portion 1c of the anode metal plate 1. The bonding material 23b may be a binder solution mixed with niobium powder 21b. The above-described porous body 22a is bonded to the anode metal plate 1 via the bonding material 23b. In this way, as shown in FIG. 6, an anode material A1' is prepared which includes an anode metal plate 1 and a porous body 22a laminated to the metal plate via the bonding material 23b.

Thereafter, with the porous body 22a laminated to the anode metal plate 1, the entirety of the anode material A1' is heated. As a result, the porous body 22a is sintered, whereby a first sintered member 2a is obtained. Since the bonding material 23b is also heated in this process step, the binder solution contained in the bonding material 23b volatilizes. At the same time, the powder 21b contained in the bonding material 23b is sintered, whereby a second sintered member 2b is obtained. Preferably, this heating is performed in an atmosphere of e.g. argon gas for preventing oxidizing and nitriding.

The anode A1 is subjected to chemical conversion treatment using an aqueous solution of phosphoric acid, for example, whereby a dielectric layer is formed at an inner surface and part of an outer surface of the first and the second sintered members 2a, 2b. Further, a solid electrolytic layer is formed on the dielectric layer by using treatment liquid such as a solution of manganese nitrate or a solution of conductive polymer. Through these process steps, a solid electrolytic capacitor using the anode A1 can be manufactured.

Figure 7:
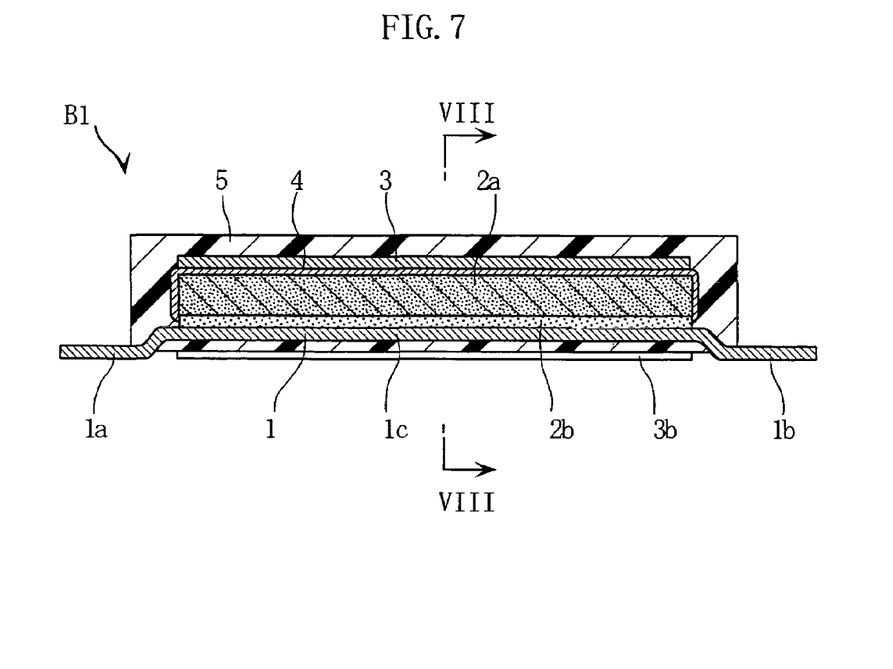
FIG. 7 is a sectional view showing a solid electrolytic capacitor utilizing the anode shown in FIG. 1.
Figure 8:
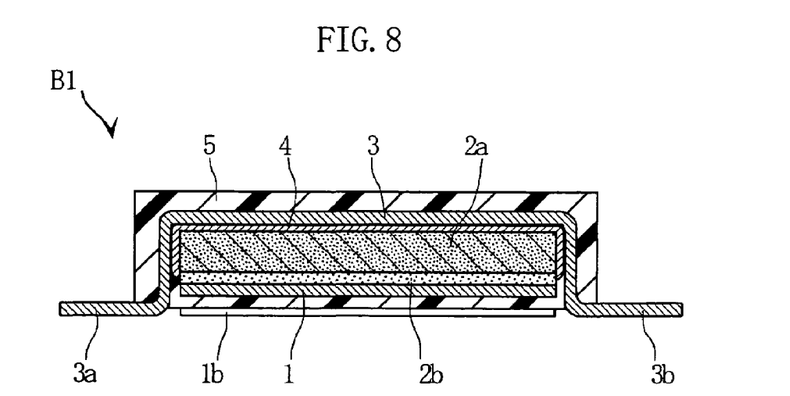
FIG. 8 is a sectional view taken along lines VIII-VIII in FIG. 7.

FIGS. 7 and 8 show an example of solid electrolytic capacitor using the anode A1. The illustrated solid electrolytic capacitor B1 includes a cathode metal plate 3, a sealing resin member 5 and so on in addition to the above-described anode A1. The cathode metal plate 3 is bonded to the upper surface of the first sintered member 2a via a conductive layer 4 and electrically connected to the solid electrolytic layer (not shown) formed at the first sintered member 2a. For instance, the conductive layer 4 is made up of a graphite layer and a silver paste layer laminated on the solid electrolytic layer. The sealing resin member 5 partially covers the first and the second sintered members 2a, 2b, the anode metal plate 1 and the cathode metal plate 3. The opposite end portions 1a and 1b of the anode metal plate 1 project from the sealing resin member 5 to serve as an inputting and an outputting external anode terminals, respectively. The cathode metal plate 3 includes portions projecting from the sealing resin member 5, and the projecting portions serve as an inputting and an outputting external cathode terminals 3a and 3b. In this way, the solid electrolytic capacitor B1 is designed as a so-called four-terminal solid electrolytic capacitor provided with the inputting and the outputting external anode terminals 1a and 1b and the inputting and the outputting external cathode terminals 3a and 3b to be surface-mounted by utilizing these terminals.

In the above-described structure, the first sintered member 2a is not directly bonded to the anode metal plate 1. Therefore, the first sintered member 2a does not need to have properties suitable for bonding to the anode metal plate 1. Therefore, as the material of the porous body 22a, it is possible to select powder having an average particle size which can be compacted by a high pressure into a high density and which is suitable for forming minute pores therein. Further, according to the above-described manufacturing method, a first sintered member 2a having a high density can be obtained by forming, in advance, a porous body 22a having a high density by compacting. When the first sintered member 2a has a high density, the capacitance per unit volume is large. Therefore, with respect to the solid electrolytic capacitor B1, a reduction in size and an increase in capacitance can be realized. Since the capacitance of the solid electrolytic capacitor B1 can be increased by the first sintered member 2a, the second sintered member 2b does not need to have such a high density. For instance, therefore, the second sintered member 2b can be made of a bonding material 23b containing a binder solution and powder 21b having an average particle size suitable for bonding the first sintered member 2a to the anode metal plate 1. Therefore, the first and the second sintered members 2a, 2b and the anode metal plate 1 can be reliably bonded together, and the resistance and inductance of these can be reduced so that the ESR and ESL of the solid electrolytic capacitor B1 are reduced.

Since the first sintered member 2a is thin, the current path between the anode metal plate 1 and the cathode metal plate 3 is shortened. Therefore, the resistance and inductance between the anode metal plate 1 and the cathode metal plate 3 can be reduced, which is suitable for reducing the ESR and ESL of the solid electrolytic capacitor B1.

The external anode terminals 1a and 1b are provided by utilizing part of the anode metal plate 1. Therefore, an additional member for forming the external anode terminals 1a and 1b do not need to be prepared separately. Therefore, the manufacturing efficiency of the solid electrolytic capacitor B1 is enhanced, and the manufacturing cost is reduced. Since the external anode terminals are formed integrally with the anode metal plate, bonding of a plurality of metal parts is not necessary, which is advantageous for reducing the ESR and the ESL.

Unlike the manufacturing method described above, after the porous body 22a is formed by compacting, the porous body 22a may be solely sintered to form the first sintered member 2a, and the first sintered member 2a may be bonded to the anode metal plate 1 via the bonding material 23b. In this manufacturing method, the bonding material 23b is not sintered in the process of sintering the porous body 22a. As the powder 21b to be contained in the bonding material 23b, use may be made of powder having a relatively small average particle size so as to have a great affinity with the first sintered member 2a and the anode metal plate 1. Such powder 21b can be sintered at a relatively low temperature. Therefore, when such powder 21b is heated together with the porous body 22a, the powder is sintered excessively so that the bonding between the first sintered member 2a or the anode metal plate 1 and the second sintered member 2b may not be performed properly. Such a problem can be solved by sintering the porous body 22a solely, as noted above. In this case, after the first sintered member 2a obtained is bonded to the anode metal plate 1 via the bonding material 23b, these are heated to a temperature suitable for sintering the bonding material 23b, whereby the second sintered member 2b and the anode metal plate 1 can be properly bonded together.

FIGS. 9-14 show other embodiments of the present invention. In these figures, the elements which are identical or similar to those of the first embodiments are designated by the same reference signs as those used for the first embodiment.

Figure 9:
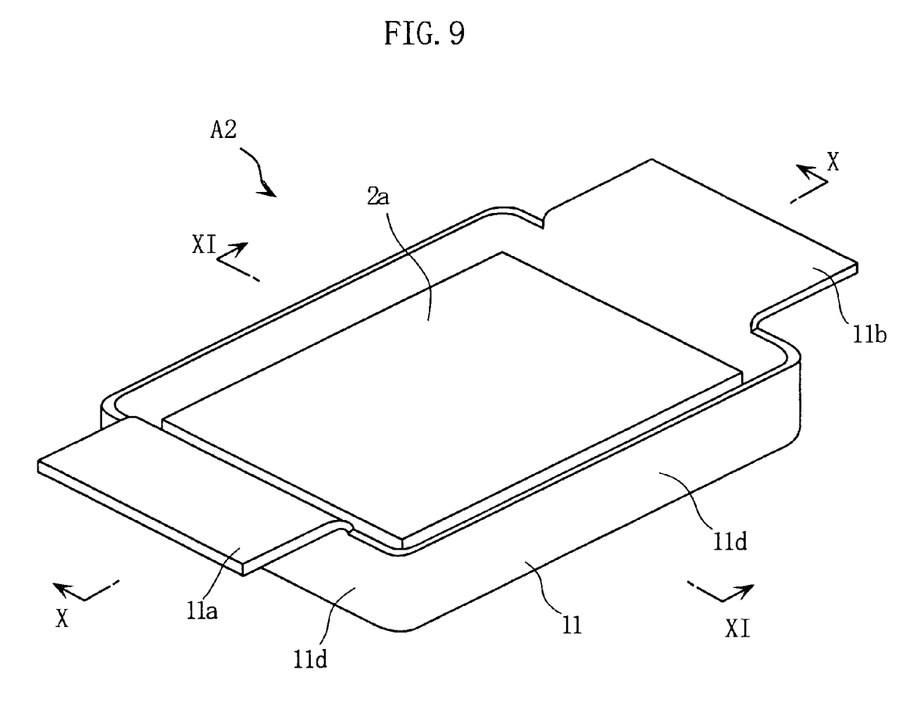
FIG. 9 is a perspective view showing a solid electrolytic capacitor anode according to a second embodiment of the present invention.
Figure 10:
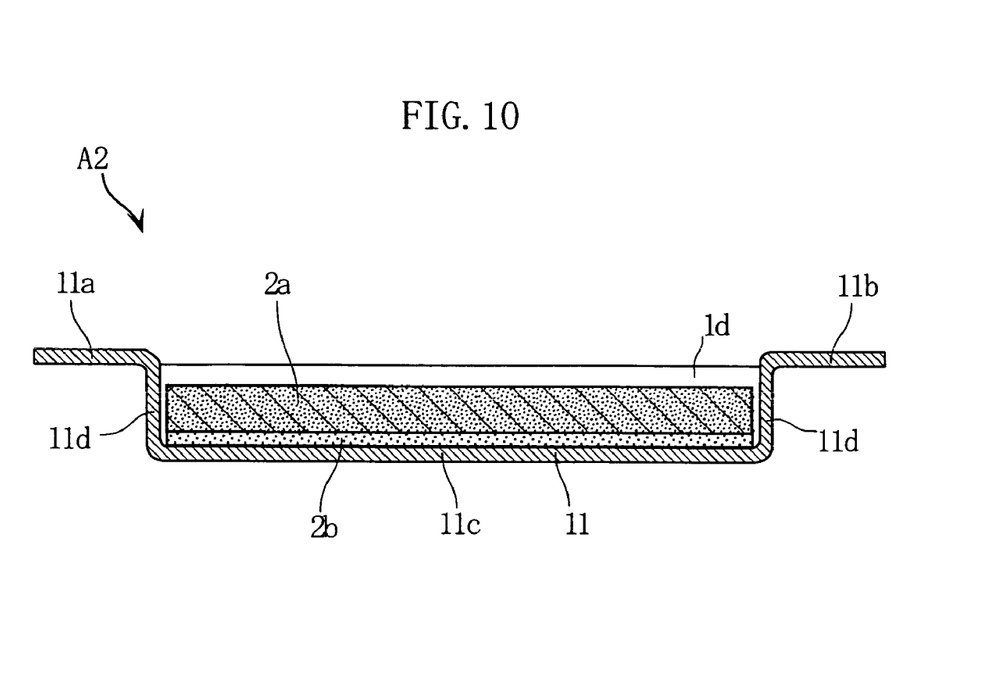
FIG. 10 is a sectional view taken along lines X-X in FIG. 9.
Figure 11:
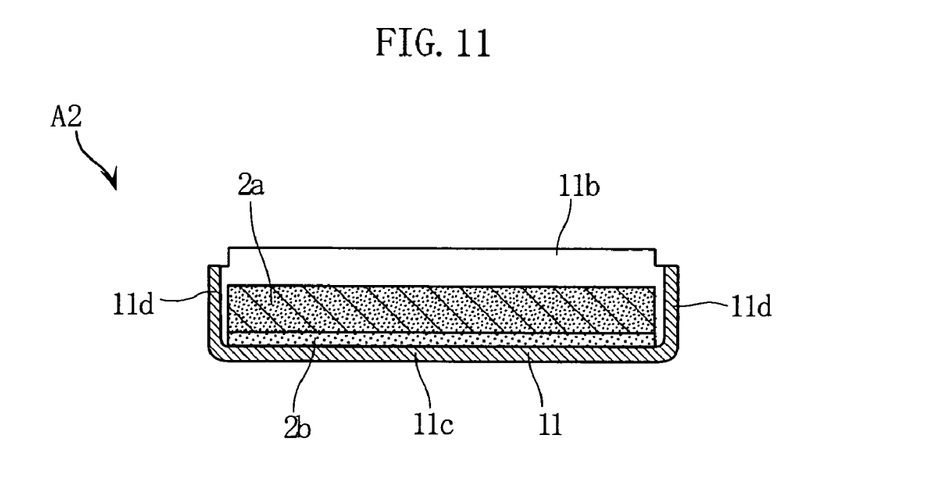
FIG. 11 is a sectional view taken along lines XI-XI in FIG. 9.

FIGS. 9-11 show an example of a solid electrolytic capacitor anode according to a second embodiment of the present invention. The illustrated anode A2 differs from that of the first embodiment in that the anode includes a metal case 11 instead of the anode metal plate 1. The metal case 11 includes two end portions 11a and 11b projecting in opposite directions from each other, a base portion 11c and four side walls 11d. In a solid electrolytic capacitor which will be described later, the end portions 11a and 11b are utilized as an inputting and an outputting external anode terminals. The base portion 11c and four side walls 11d define a space for accommodating a first and a second sintered members 2a and 2b. As shown in FIG. 10, the upper surface of the first sintered member 2a is positioned lower than the upper edges of the side walls 1d. That is, the first sintered member 2a (and the second sintered member 2b) is completely accommodated in the accommodation space.

With this structure, in e.g. transferring the anode A2, the sintered members 2a and 2b are prevented from hitting against the surrounding objects ("obstacles"). When the sintered member 2a (or 2b) hits against an obstacle, minute holes formed at an outer surface of the sintered member may be closed. In such a case, it is difficult to properly impregnate the sintered member 2a with a solution for forming a dielectric layer and a solid electrolytic layer, so that the dielectric layer and the solid electrolytic layer cannot be formed properly. A solid electrolytic capacitor utilizing such a defective anode has drawbacks such as insufficient capacity and large leakage current. According to the second embodiment of the present invention, such drawbacks can be avoided, and a solid electrolytic capacitor can be manufactured properly.

Figure 12:
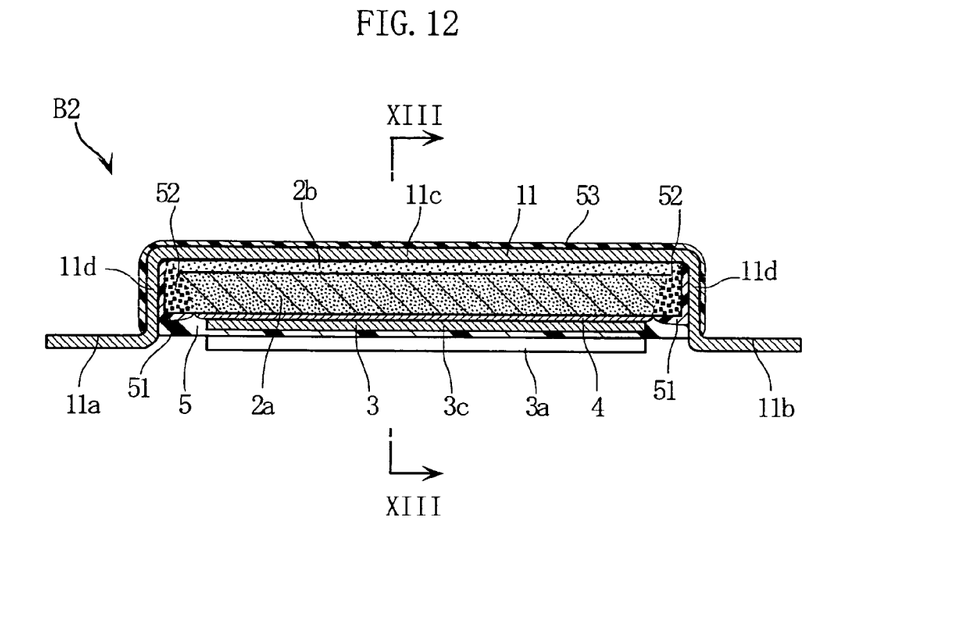
FIG. 12 is a sectional view showing a solid electrolytic capacitor utilizing the anode shown in FIG. 9.
Figure 13:
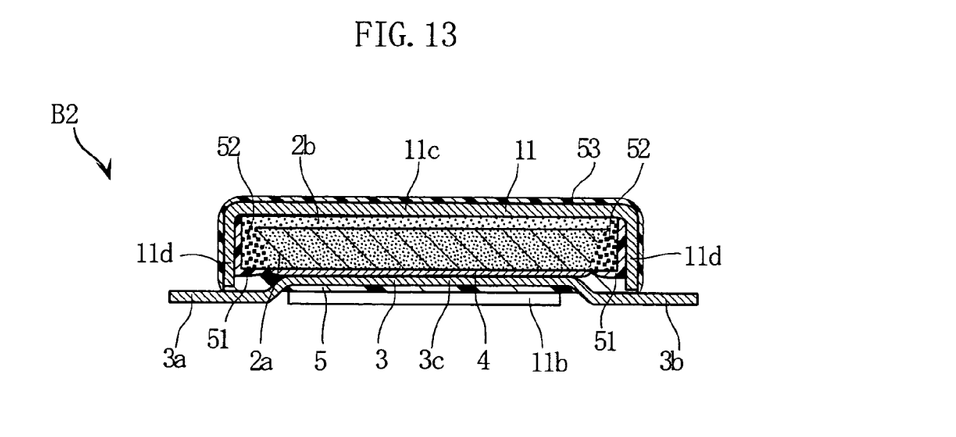
FIG. 13 is a sectional view taken along lines XIII-XIII in FIG. 12.

FIGS. 12 and 13 show an example of solid electrolytic capacitor utilizing the above-described anode A2. It is to be noted that, in the illustration of FIGS. 12 and 13, the up-down orientation of the anode A2 is opposite from that in FIGS. 9-11. In the solid electrolytic capacitor B2 shown in FIGS. 12 and 13, a cathode metal plate 3 is laminated to a lower surface of the first sintered member 2a via a conductive layer 4. The cathode metal plate 3 includes a center portion 3c covered by a sealing resin member 5 and opposite end portions which are not covered by the sealing resin member 5 and serve as external cathode terminals 3a and 3b. An insulating resin 51 is provided for preventing the conductive layer 4 and the solid electrolytic layer (not shown) from being undesirably connected electrically to the metal cover 11 in the process of manufacturing the solid electrolytic capacitor B2. The insulating resin 51 enters part of the first and the second sintered members 2a and 2b to form insulating portions 52 which have the same function as that of the insulating resin 51. A resin coating 53 is applied to most part of the outer surface of the metal case 11. Therefore, when the solid electrolytic capacitor B2 and other electronic components are mounted on e.g. a printed circuit board, undesirable electrical connection between the electronic components and the metal case 11 can be prevented.

The metal cover 11 has a higher rigidity than that of the sealing resin member 5. Therefore, even when heat is generated at the first and the second sintered members 2a and 2b in the use of the solid electrolytic capacitor B2, the solid electrolytic capacitor B2 is prevented from unduly warping entirely. Further, the metal cover 11 is superior in thermal conductivity to the sealing resin member 5. Therefore, the heat generated from the first and the second porous sintered members 2a and 2b can be properly dissipated, so that the capacitor is suitable for high power supply.

Figure 14:
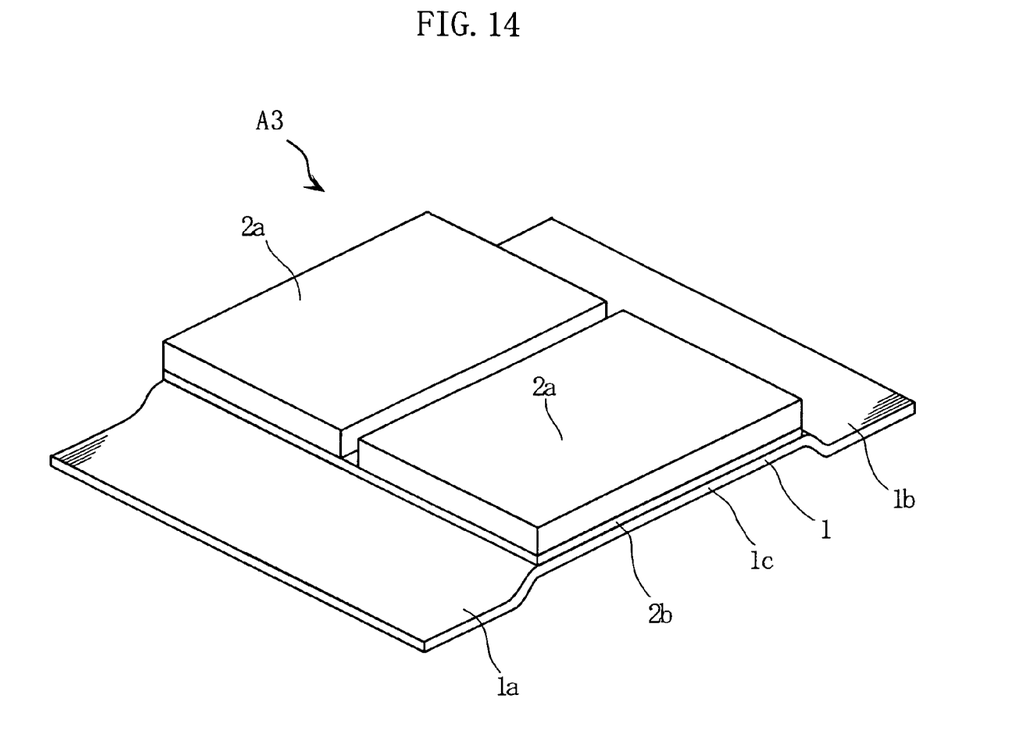
FIG. 14 is a perspective view showing a solid electrolytic capacitor anode according to a third embodiment of the present invention.

FIG. 14 shows an anode according to a third embodiment of the present invention. The illustrated anode A3 differs from the anode A1 of the first embodiment in that the first sintered member comprises a plurality of sintered elements 2a (two sintered elements in the illustrated example). The sintered elements 2a are flat and arranged side by side in a direction crossing the thickness direction of these elements (vertical direction in FIG. 14). The anode A3 can be manufactured by a method similar to the manufacturing method of the above-described anode A1.

In the third embodiment, the first sintered member is provided by using the plurality of sintered elements 2a. Therefore, the volume of the first sintered member (i.e., the total volume of the sintered elements 2a) can be increased while reducing the thickness of the first sintered member (i.e., the thickness of the sintered elements 2a). Although this need (small thickness and large volume) can be satisfied also by a single sintered member as is in the first embodiment (See FIG. 1), the formation of a porous body having a large size and a small thickness by the above-described compacting process may be difficult. In such a case, the first sintered member can be made up of a plurality of appropriate sintered elements. According to the third embodiment, by using a plurality of sintered elements 2a, large capacitance can be achieved while satisfying the need for a reduction in thickness and ESL of the solid electrolytic capacitor. The number of sintered elements 2a is not limited to two, and three or more sintered elements may be provided. The plurality of sintered elements may be arranged in a matrix.

In the present invention, the solid electrolytic capacitor is not limited to the foregoing embodiments. The specific structure of each part of the solid electrolytic capacitor can be modified in various ways.

To reduce the ESR and the ESL, it is preferable that the first sintered member is thin. However, the present invention is not limited thereto, and a first sintered member which is not thin may be provided.

As the valve metal, tantalum may be used instead of niobium. Alternatively, an alloy containing niobium or tantalum may be used. Further, niobium oxide may be used as the valve metal.

The inventor of the present invention has found that a compacted body (pellet) made of niobium oxide is very liable to be fused to niobium as pure metal at temperatures around 1100° C., and preferably at temperatures higher than 1400° C. As an example of phenomenon which supports this finding, when a pellet made of niobium oxide powder is sintered on a tray made of niobium, the sintered body of the pellet is fused to the tray and cannot be removed from the tray. The inventor of the present invention has confirmed that, in such a fuse phenomenon, oxygen in niobium oxide diffuses into the metal niobium. Specifically, the inventor has confirmed that when a pellet made of niobium oxide powder is fused to a metal plate made of niobium (having a thickness on the order of 100 microns), the oxygen content in the reverse surface of the metal plate is increased. On the other hand, niobium oxide powder is not readily sintered as compared with metal niobium powder. Because of this characteristics, a pellet made of niobium oxide powder can be sintered at a high temperature.

In view of the above-described characteristics of niobium oxide, each of the structural parts (the metal plate, the first sintered member and the second sintered member) of the capacitor anode of the present invention may be made of niobium oxide (or a material containing niobium oxide). For instance, in FIG. 2, the metal plate 1 and the first sintered member 2a may be made of niobium, whereas the second sintered member 2b made of niobium oxide. With such a structure, bonding with appropriate strength can be achieved between the second sintered member 2b and the metal plate 1, and between the second sintered member 2b and the first sintered member 2a.

As compared with niobium oxide described above, tantalum powder and niobium powder are readily sintered at relatively low temperatures (in other words, cannot be sintered at high temperatures). Therefore, as the particle size becomes smaller, the proper sintering between a pellet made of tantalum powder or niobium powder and a metal plate becomes more difficult. This situation is not desirable particularly when the pellet is large. Specifically, since a larger pellet shrinks to a greater extent in sintering, the pellet (sintered body) and the metal plate cannot be properly bonded to each other in sintering. The low sintering temperature further causes the following problems. A solid electrolytic capacitor provided by using a large volume of powder tends to have increased LC per unit area. One of the reasons for this is the presence of e.g. carbon remaining in the sintered body. Such residual carbon can be removed if the sintering temperature is high but cannot be removed at a low temperature for sintering tantalum powder or niobium powder. This problem can be solved by using niobium oxide whose sintering temperature is high. Further, the residual carbon can be removed also by oxygen contained in niobium oxide.

Although it is preferable that the external anode terminals are integrally formed on the metal plate to achieve a low resistance and so on, the present invention is not limited thereto. For instance, a part separately prepared as an external anode terminal may be electrically connected to an anode metal plate in the form of a flat plate. The structure of the solid electrolytic capacitor is not limited to those described above and may be of a so-called two-terminal type or three-terminal type. The application of the solid electrolytic capacitor according to the present invention is not limited to a particular one.

The invention claimed is:

1. A solid electrolytic capacitor comprising:
 a first metal plate made of valve metal to serve as a first electrode;
 a porous sintered body provided on the first metal plate and made of valve metal;
 a second metal plate bonded to the porous sintered body to serve as a second electrode; and
 a sealing resin member enclosing the first metal plate, the second metal plate and the porous sintered body;
 the porous sintered body includes a first sintered member, and a second sintered member intervening between the first sintered member and the first metal plate;
 the first sintered member is greater in density than the second sintered member;
 the first metal plate has a first opposite pair of terminals projecting from the sealing resin member in a first direction; and
 the second metal plate has a second opposite pair of terminals projecting from the sealing resin member in a second direction crossing the first direction.

2. The solid electrolytic capacitor according to claim 1, wherein the first sintered member is thin.

3. The solid electrolytic capacitor according to claim 1, wherein the first sintered member includes a plurality of sintered elements, and the sintered elements are arranged side by side in a direction crossing a thickness direction of the sintered elements, the second sintered member commonly supporting the plurality of sintered elements.

4. A method for manufacturing an anode for a solid electrolytic capacitor, the method comprising:
 preparing a porous sintered body made of valve metal and a metal plate made of valve metal; and
 bonding the porous sintered body and the metal plate to each other by using a bonding material containing valve metal powder;
 wherein the porous sintered body is prepared by sintering separately from the valve metal powder of the bonding material; and
 the valve metal powder of the bonding material is sintered by heating at a lower temperature than a sintering temperature for the porous sintered body.

5. A solid electrolytic capacitor comprising:
 a metal case made of valve metal to serve as a first electrode;
 a porous sintered body provided in the metal case and made of valve metal;
 a metal plate bonded to the porous sintered body to serve as a second electrode;
 a sealing resin member filled in the metal case for enclosing the porous sintered body;
 the porous sintered body includes a first sintered member, and a second sintered member intervening between the first sintered member and the metal case;
 the first sintered member is greater in density than the second sintered member;
 the metal case has a first opposite pair of terminals projecting from the metal case in a first direction; and
 the metal plate has a second opposite pair of terminals projecting beyond the metal case in a second direction crossing the first direction.

* * * * *